N. NILSON.
TRACTION MACHINE.
APPLICATION FILED MAR. 6, 1915.

1,321,937.

Patented Nov. 18, 1919.
4 SHEETS—SHEET 1.

WITNESSES

INVENTOR
NILS NILSON
BY
ATTORNEYS

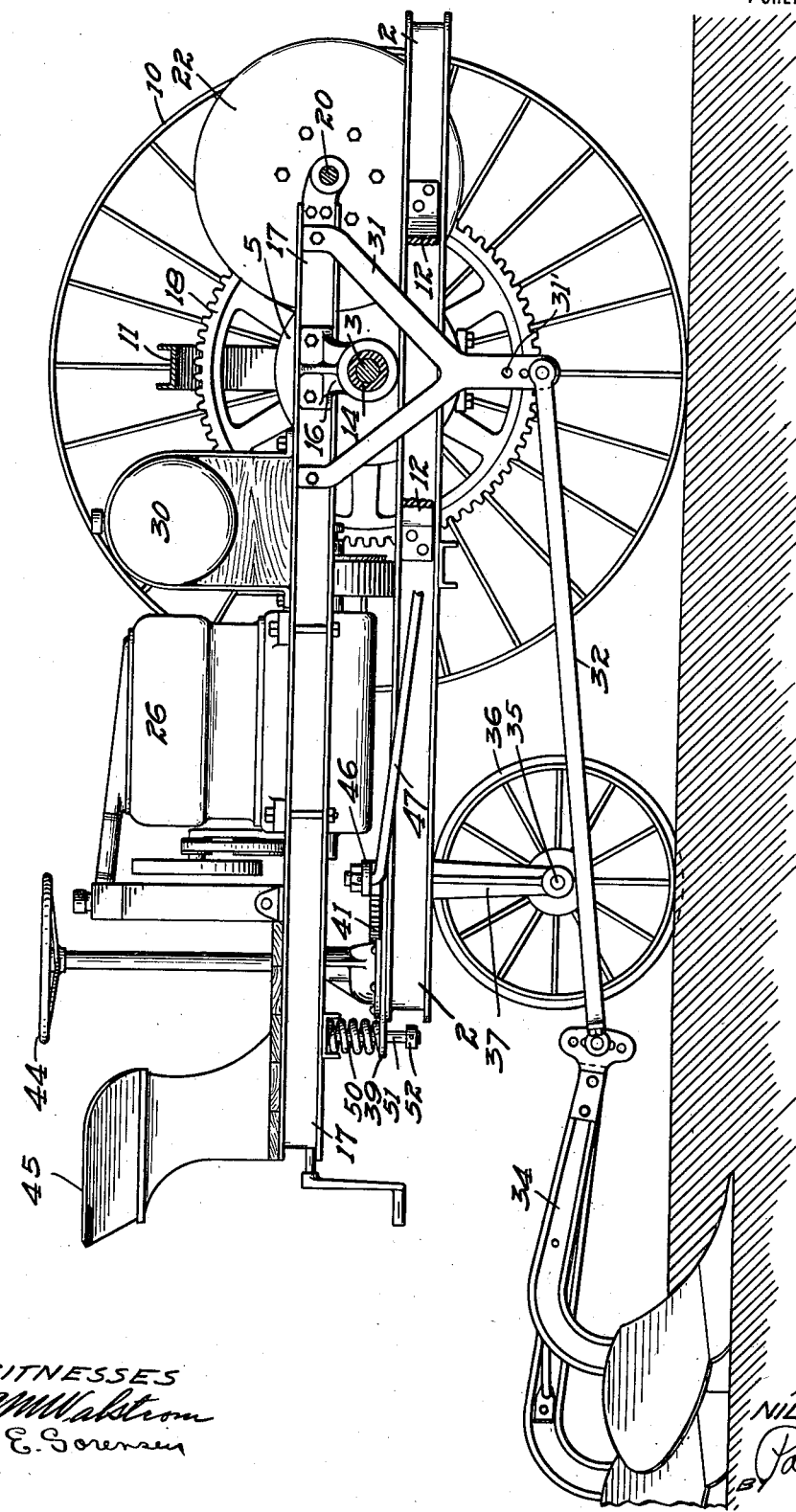

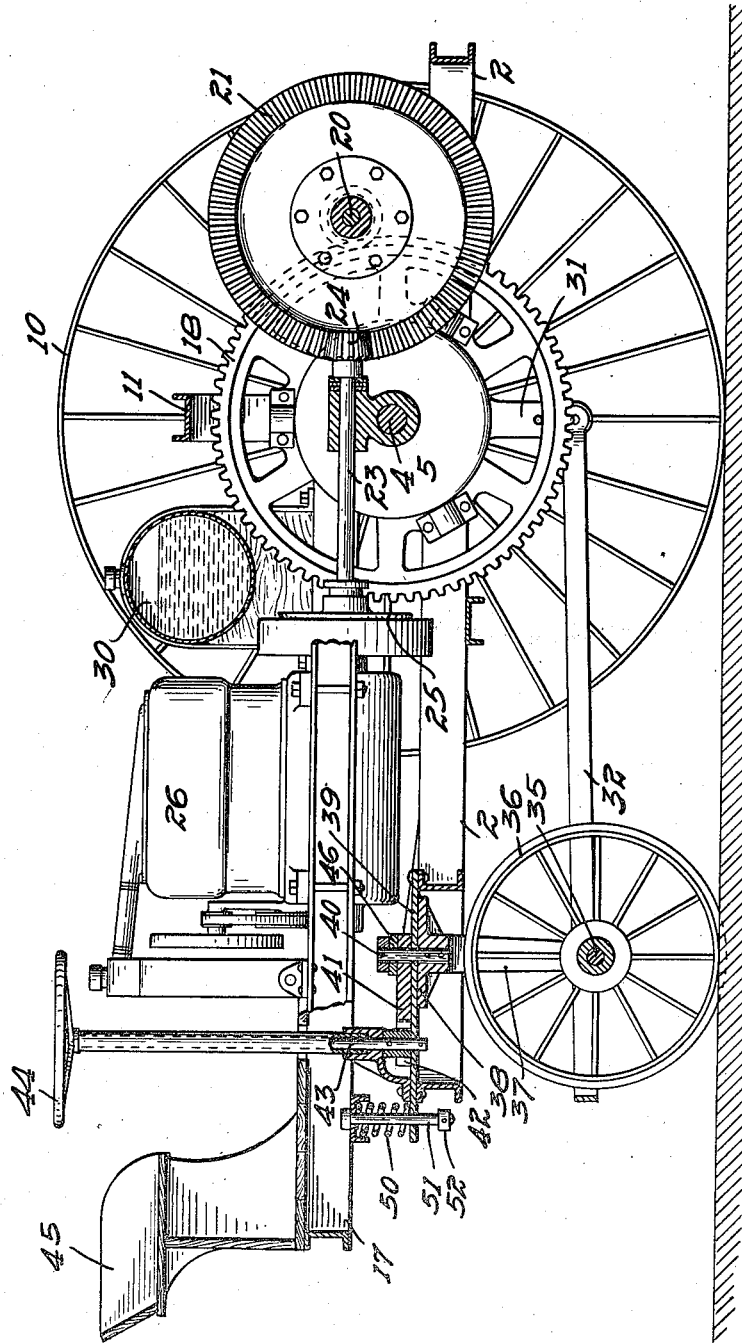

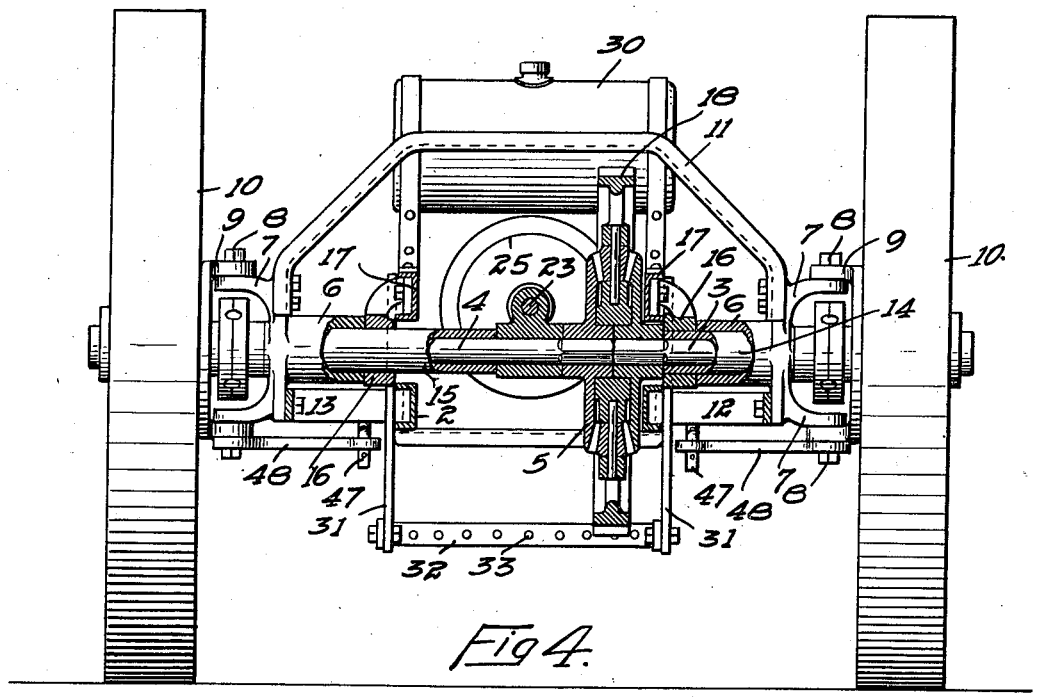
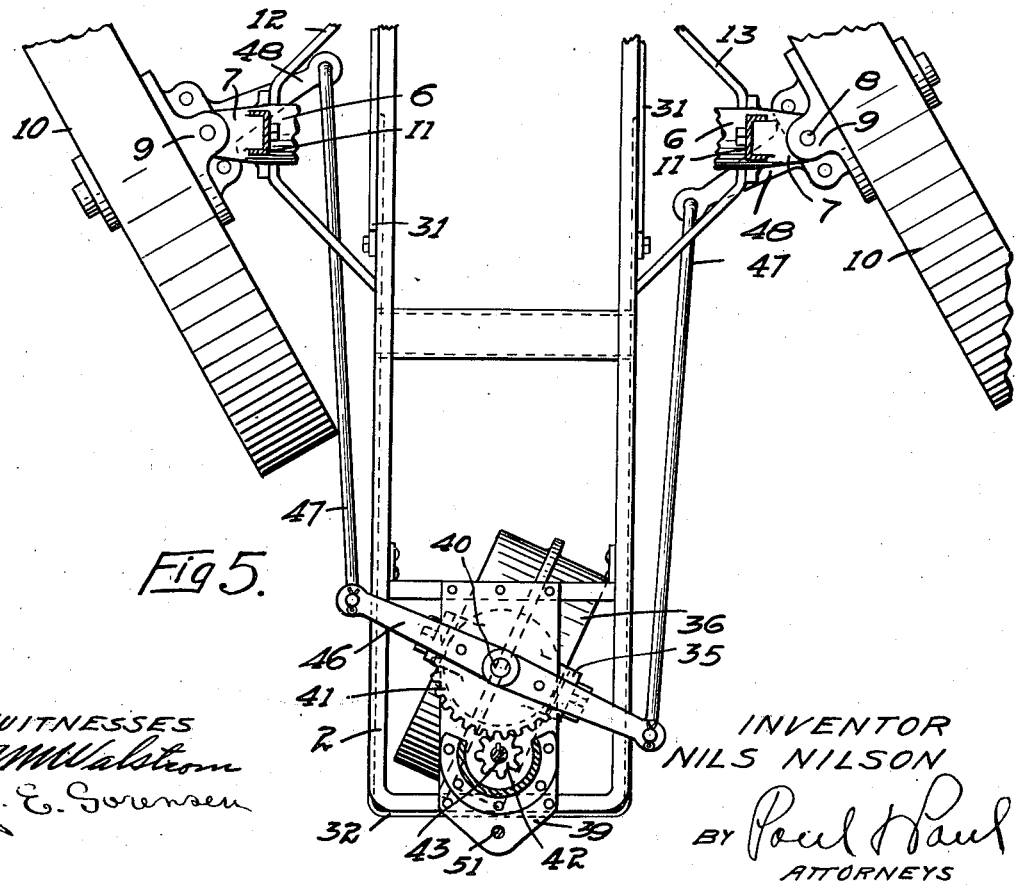

UNITED STATES PATENT OFFICE.

NILS NILSON, OF WAYZATA, MINNESOTA.

TRACTION-MACHINE.

1,321,937.    Specification of Letters Patent.    Patented Nov. 18, 1919.

Application filed March 6, 1915. Serial No. 12,647.

*To all whom it may concern:*

Be it known that I, NILS NILSON, citizen of the United States, resident of Wayzata, county of Hennepin, State of Minnesota, have invented certain new and useful Improvements in Traction-Machines, of which the following is a specification.

The object of my invention is to provide a traction machine or engine capable of use in various ways but particularly adapted for plowing.

A further object is to provide an engine in which the traction wheels are arranged in front, with means for applying the draft of the plows to increase the traction of the wheels.

A further object is to provide a means for increasing the traction which will also tend to relieve the weight on the steering wheel to facilitate turning of the same.

The invention consists generally in various constructions and combinations, all as hereinafter described and particularly pointed out in the claims.

In the accompanying drawings forming part of this specification,

Fig. 2 is a longitudinal sectional view of the same,

Fig. 3 is a similar view taken along another section line, illustrating the drive mechanism and the details of the steering device, Fig. 4 is a front elevation, partially in section, of the machine, Fig. 5 is a plan view, showing the traction wheels oscillated to make a quick turn.

Figure 1:
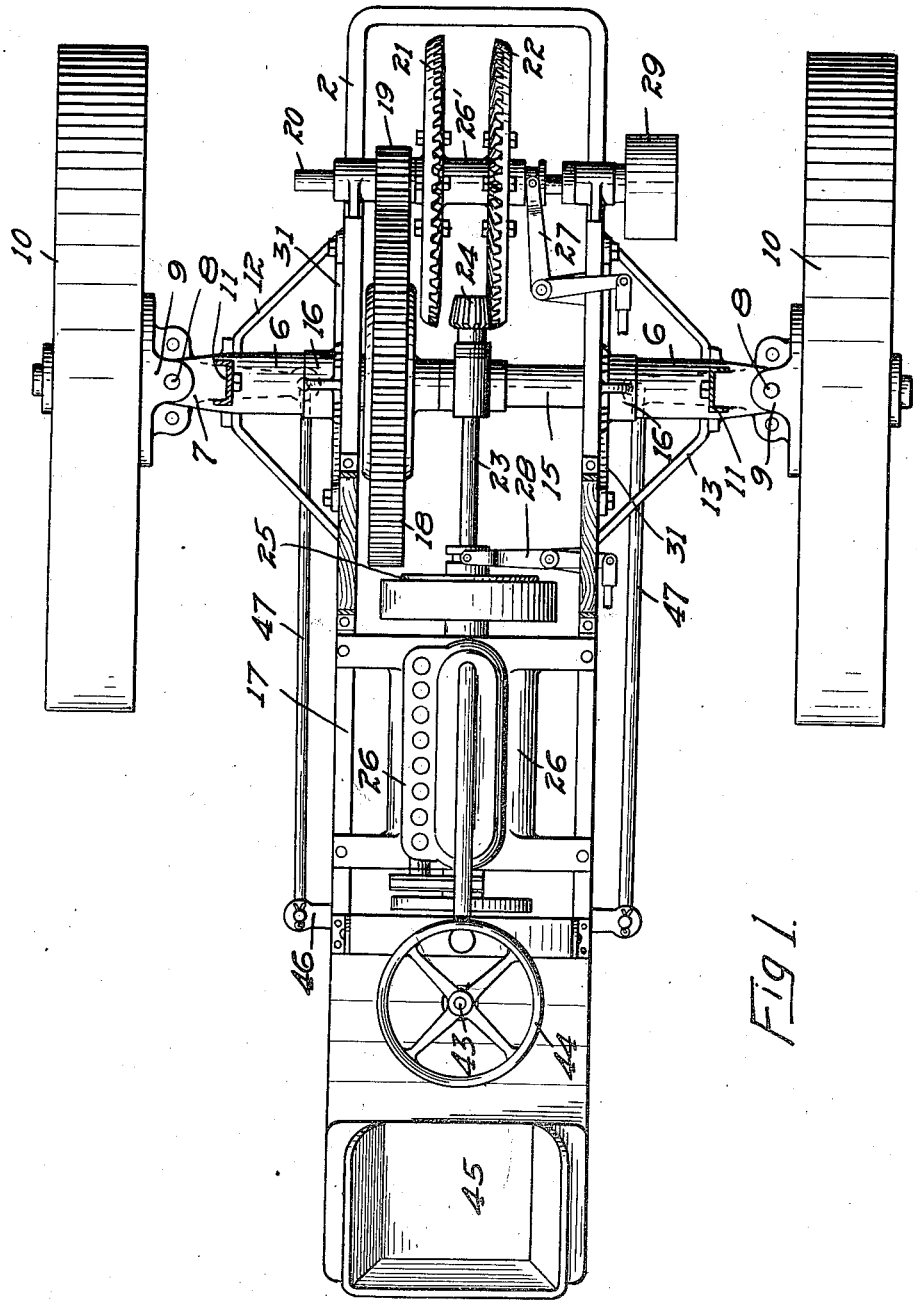
Figure 1 is a plan view of a traction engine embodying my invention.

In the drawing, 2 represents a frame, rectangular substantially in form, and composed preferably of channel bar. 3 and 4 are axle sections, placed end to end, with the differential 5 of ordinary construction between them. Hubs 6 are mounted on the axle sections and are provided with arms 7 connected by vertical pivots 8 with similar arms 9 on the hubs of the traction wheels 10. The hubs 6 are connected with one another across the machine by an arched yoke 11 and braces 12 and 13 connect the frame 2 on opposite sides of the machine with the outer portions of the hubs 6. Sleeves 14 and 15 are provided on the axle sections and on which the hubs 6 are mounted, and collars 16 have bearings on the inner portions of the sleeves 14 and 15 above the frame 2 and have upper portions that are securely bolted to an upper or supplementary frame 17. This frame is adapted to swing on the sleeves 14 and 15 which form a fulcrum therefor. The gear 18 of the differential meshes with a pinion 19 on a shaft 20 that is provided with beveled gears 21 and 22. A driving shaft 23 has a pinion 24 to mesh with either one of the gears 21 and 22 and a clutch 25 connects the driving shaft with an internal combustion engine 26 that is mounted on the middle portion of the frame 17 in the rear of the traction wheel axles. The gears 21 and 22 are mounted on a collar 26' which is adapted to slide on the shaft 20 and is provided with a clutch operating device 27 attached to an operating lever, not shown. A similar clutch-operating device 28 is provided in connection with the clutch 25. The shaft 20 is also preferably provided with a pulley 29 for transmitting power through a belt, not shown, for operating some piece of machinery when the traction engine is stationary. An oil reservoir 30 is mounted on the frame 17 in front of the axle and in the rear of the engine, as shown. Hangers 31 are secured at their upper ends to the frame 17 and are preferably Y-shaped and arranged to straddle the axle and depend below the same and the frame 2, having a row of holes 31' to receive the ends of the draft bar 32, which also has holes 33 therein for attaching the plows 34 thereto.

The superstructure frame 17 has the function substantially of a scale beam fulcrumed on the axle sections and when strain is applied to the forward portion of this frame it will tend to lift the rear portion in much the same way as a scale beam is tilted by the pull of the load on the scale platform. Of course in practice this superstructure frame with the load thereon would hardly ever be lifted, but the tendency of the pull of the draft connections on the forward portion of this frame would be to exert a lifting action on the rear portion and at the same time draw down on the forward portion of the frame and increase the traction of the wheel.

The draft connection 32 extends rearwardly under the rear portion of the frame 2 and beneath the axle 35 of a steering wheel 36 that is mounted in a fork 37, the upper portion of which has a flat bearing surface 38 seated on the underside of a plate 39 that is secured to the rear portion of the frame 2. A stud 40 depends through the plate 39 and is secured to the upper portion of the fork 37 and carries a segmental gear 41 which meshes with a pinion 42 on the lower end of a steering post 43, the upper portion of which has the usual hand wheel 44 convenient to the driver's seat 45.

Mounted on the stud 40 is a rock bar 46 having link connections 47 connecting the ends of the rock bar with arms 48 which project inwardly from the pivots of the traction wheels 10, thereby insuring the rocking of the traction wheels on their bearings or their tilting to guide the machine. The steering post has a pinion 42 mounted to mesh with the gear 41 to rock it on its bearing and tilt the wheels inwardly or outwardly, as desired. A spring 50 is interposed between the rear portions of the frames 2 and 17 and a bolt 51 is carried by the frame 17 and adapted to slide on the frame 2 and has a stop 52 for limiting the upward movement of the bolt. This upper frame is pivoted by means of the collars 16 on the sleeves 14 and 15 and consequently can swing vertically, being cushioned by the springs 50 at the rear of the machine and limited against extreme upward movement at said rear end by the bolts 51. The draft bar connected to the lower ends of the hangers 31 will, when strain is put upon them by the plows 34, draw backwardly and downwardly on the frame 17 and tend to swing it on its fulcrum and exert a lifting action on the rear portion of this frame and increase the traction of the forward wheels, and the greater the pull on the hangers, the greater the lifting effect on the rear portion of the frame and the more pressure there will be on the forward wheels to force them into the soil. Should the superstructure frame be raised by the pull of the draft connections, the stop on the bolt 51 will engage the platform of the frame 2 and further pull on the draft connections will be transmitted to the main frame of the machine. Generally, however, the pull on the draft bars will not be sufficient to lift either one of these frames.

By an adjustment of the drag bar 32 on the hangers, their leverage on the frame 17 can be increased or decreased, as conditions may require.

In various ways the details of construction herein shown and described may be modified and still be within the scope of my invention.

I claim as my invention:

1. A traction machine comprising a frame having forward traction wheels and a rear guiding means, a member fulcrumed on the forward portion of said frame and connected with the rear thereof and a draft connection for the forward portion of said member operating to lift the rear thereof and said frame.

2. A traction engine comprising a frame, axle sections and carrying wheels for said frame, hangers mounted to straddle said axle sections and secured to said frame and depending therefrom below the axis of said wheels, a caster wheel for the rear portion of said frame, and draft connections attached to said hangers and operating to exert a rocking action of said frame on said axle sections and depress said traction wheels.

3. A traction engine comprising a frame having forward axle sections, and traction and guiding wheels therefor, hangers secured to said frame and depending therefrom below said axle sections, a frame arranged beneath said first named frame and having a caster wheel at its rear end and supporting the corresponding end of said first named frame, and draft connections for attachment to said hangers, the strain of said draft connections on said first named frame tending to rock it on said axle as a fulcrum to raise the rear portion of said frame and increase the traction of said wheels.

4. A traction engine comprising a frame, a caster wheel supporting the rear portion of said frame, traction wheels and axles therefor at the forward portion of said frame, a super-structure frame journaled on said axle sections at its forward end and yieldingly connected with said first named frame at its rear end, and a draft bar connected at its forward end to said superstructure frame and operating to lift the rear portion of said super-structure frame on said axle as a fulcrum when the draft strain is applied to said draft bar.

5. A traction machine comprising a frame and axle and carrying wheels therefor, a superstructure frame journaled on said axle, means connecting said superstructure frame with said first named frame, a draft bar connected with said superstructure frame beneath said axle and operating to lift the rear portion of said superstructure frame on said axle as a fulcrum.

6. A traction machine comprising a frame having forward wheels and an axle therefor, a superstructure frame journaled on said axle and connected at its rear end with said wheel frame, draft means connected to said superstructure frame and operating to tilt it on its axle as a fulcrum when strain is applied to said draft means.

7. A traction machine comprising a frame, a caster wheel supporting the rear portion thereof, a super-structure frame, traction wheels and an axle therefor supporting the forward portion of both said frames, said super-structure frame having a sliding connection at its rear end with the corresponding end of said first named frame, and draft means arranged below the axis of said caster wheel and connected with the forward portion of said super-structure frame and tending to lift the rear portion thereof when strain is applied thereto, said sliding connection engaging said first named frame to exert a lifting effect on it also when said super-structure frame has been tilted beyond a predetermined point.

8. A traction machine comprising a frame having forward traction wheels and axle sections therefor and a rear guiding means, a member journaled on said axle sections and having a connection with the rear portion of said frame and a draft bar mounted to exert a downward pull on the forward portion of said member and an upward pull on the rear portion thereof.

9. A traction machine comprising a frame having forward traction wheels and a rear guiding means, a member fulcrumed at its forward end and having a connection at its rear end with said frame, and a draft means connected with the forward portion of said member for rocking the same on its fulcrum and lifting the rear portion thereof.

In witness whereof, I have hereunto set my hand this 20th day of February, 1915.

NILS NILSON.

Witnesses:
 GENEVIEVE E. SORENSEN,
 EDWARD A. PAUL.